United States Patent [19]

Royston

[11] Patent Number: 4,606,565

[45] Date of Patent: Aug. 19, 1986

[54] PIPE COUPLINGS

[75] Inventor: James M. Royston, Pittsburgh, Pa.

[73] Assignee: Coupling Systems, Inc., Pittsburgh, Pa.

[21] Appl. No.: 765,674

[22] Filed: Aug. 15, 1985

Related U.S. Application Data

[63] Continuation-in-part of Ser. No. 531,034, Sep. 12, 1983.

[51] Int. Cl.$^4$ ............................................. F16L 17/00
[52] U.S. Cl. .................................. 285/337; 285/343; 285/372; 285/382.7
[58] Field of Search ............. 285/337, 372, 31, 382.7, 285/343, 369

[56] References Cited

U.S. PATENT DOCUMENTS

| | | | |
|---|---|---|---|
| 3,207,184 | 9/1965 | Lambert | 285/337 |
| 3,594,023 | 7/1971 | Yano | 285/337 |
| 4,070,046 | 1/1978 | Felker et al. | 285/337 |
| 4,119,335 | 10/1978 | Rieffle et al. | 285/337 |

Primary Examiner—Richard J. Scanlan, Jr.
Attorney, Agent, or Firm—Buell, Ziesenheim, Beck & Alstadt

[57] ABSTRACT

A pipe coupling is provided having a sleeve with frusto-conical ends, elastomeric gaskets fitting in said frusto-conical ends, a follower at each end of the sleeve, tightening bolts acting on the followers to move them axially together to compress the elastomeric gaskets radially into sealing engagement with the pipe ends, a back up ring having a frusto-conical opening spaced from each follower opposite the sleeve, frusto-conical opening in each said back up ring having its largest opening toward said sleeve, a frusto-conical split jaw in each back up ring and auxiliary tightening means for moving the back up rings towards the adjacent followers to compress said jaws into the pipe ends.

4 Claims, 3 Drawing Figures

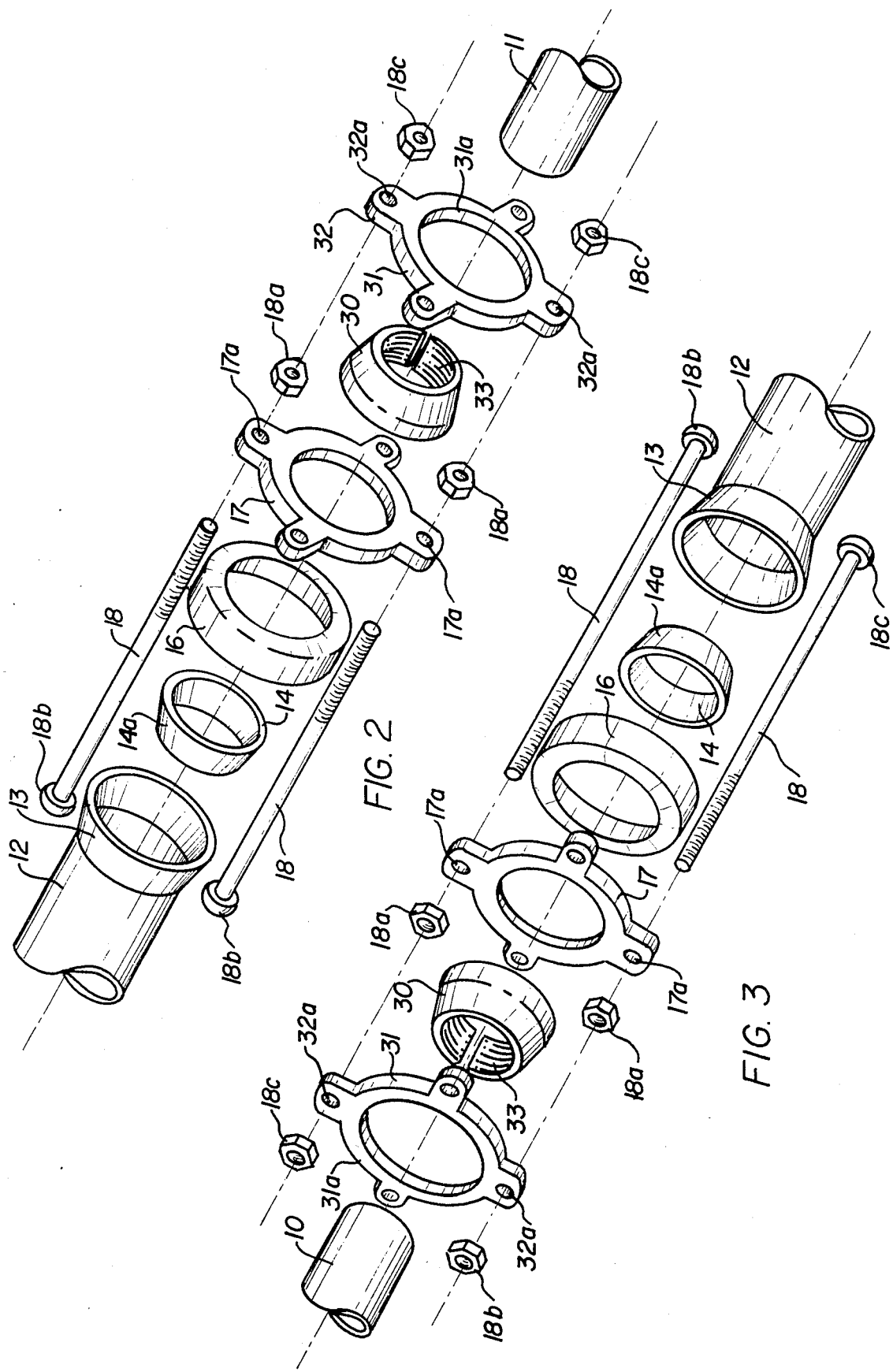

PIPE COUPLINGS

This application is a continuation-in-part of my copending application, Ser. No. 531,034, filed Sept. 12, 1983.

This invention relates to pipe couplings and particularly to a coupling for connecting two ends of anchored or unanchored pipe which will provide both a seal and a strong grip on the two separate pipe ends.

There are a wide variety of pipe couplings available for gripping and sealing two pipe ends where at least one of the pipes being connected is unanchored and free for at least limited longitudinal movement. Typical of such devices are those illustrated in Felker et al., U.S. Pat. No. 4,070,046, and Rieffle et al., U.S. Pat. No. 4,119,335. All of these devices have a common characteristic, namely, that the gripping ring or member at each end engages the pipe end around which it is placed before the seal ring completes the seal. Further tightening draws the coupling gripping member toward each other completing the seal. This requires that at least one pipe end be free to move toward the other. Where the two pipe ends are anchored and not free to move, the gripping members engage the pipe circumference tightly before the seal occurs as they normally do, however, further tightening will not complete the seal unless the gripping members slide or the pipe ends move, neither of which can or should occur in many cases. As a result the pipe ends are gripped tightly but not sealed.

My copending application solves this problem in part by providing a coupling which has one independently movable gripping member which can be tightened into gripping engagement after the seal has been completed and the other gripping member tightly engaged on one pipe end.

There are, however, situations where, particularly with large diameter pipe, it is desirable to have two independently movable gripping members with or without internal insulators and electrical continuity wiring capacity.

I provide a coupling member for connecting two ends of pipe both of which are anchored remote from the connection including an elongate sleeve adapted to receive coaxially two opposing pipe or tube ends to be connected, said sleeve having frusto-conical enlarged ends, a pair of frusto-conical elastomer sealing gaskets adapted to fit in said frusto-conical ends in tight engagement around the pipe ends to be connected, said gaskets extending out of said frusto-conical ends of the sleeve, a follower member at each end of the sleeve bearing on said gaskets to force them into the frusto-conical ends of the sleeve, tightening means extending between the follower means acting to move them axially together to force the gaskets into tight sealing engagement with the pipe ends being joined to create a tight seal between the pipe ends and sleeve, a back up ring spaced from each of the follower means at opposite ends of the sleeve, each having a frusto-conical opening therein, a frusto-conical jaw means in each said frusto-conical opening in each said back up ring, surface engaging means on the inside of said jaw means adapted to engage the surface of the other pipe end against movement and auxiliary tightening means between each of the follower means and the adjacent back up ring for drawing said back up ring axially toward the said adjacent follower means to force the frusto-conical jaw means into tight radial engagement with the said other pipe end, said tightening means and auxiliary tightening means operative in at least two pairs, each pair connecting the two follower means and one back up ring so that axial movement of the back up rings away from one another draws the follower means toward each other to more tightly compress the gaskets. The frusto-conical jaw means may be a single split ring as in German patent No. P 1944782.6, a plurality of spaced jaw members or a multiple split ring as in U.S. Pat. No. 4,070,046. The sealing gaskets may be of rubber or any other suitable elastomeric material capable of creating a seal under pressure. Preferably, the tightening means and auxiliary tightening means is a plurality of pairs of elongate bolts extending through both follower means and alternatively through each back up ring and threaded to take tightening nuts bearing on said follower means and on the particular back up ring separately so that they are moveable independently of one another so that axial movement of the back up rings away from each other draws the follower means toward each other. This provides the unique result that the greater the pulling force on the pipes, the tighter the gasket seal.

The back up ring and split frusto-conical jaw ring disclosed herein may be combined with old couplings of standard type using only seals by using long carriage bolts with such couplings and alternate back up rings to produce the structure here disclosed.

In the foregoing general description certain objects, purposes and advantages of this invention have been set out. Other objects, purposes and advantages of this invention will be apparent from a consideration of the following description and the accompanying drawings in which:

FIG. 2 is an exploded isometric fragmentary view of the right end of the connector of FIG. 1 showing the parts involved; and FIG. 3 is an exploded isometric fragmentary view of the left end of the connection of FIG. 1 showing the parts involved.

Figure 1:
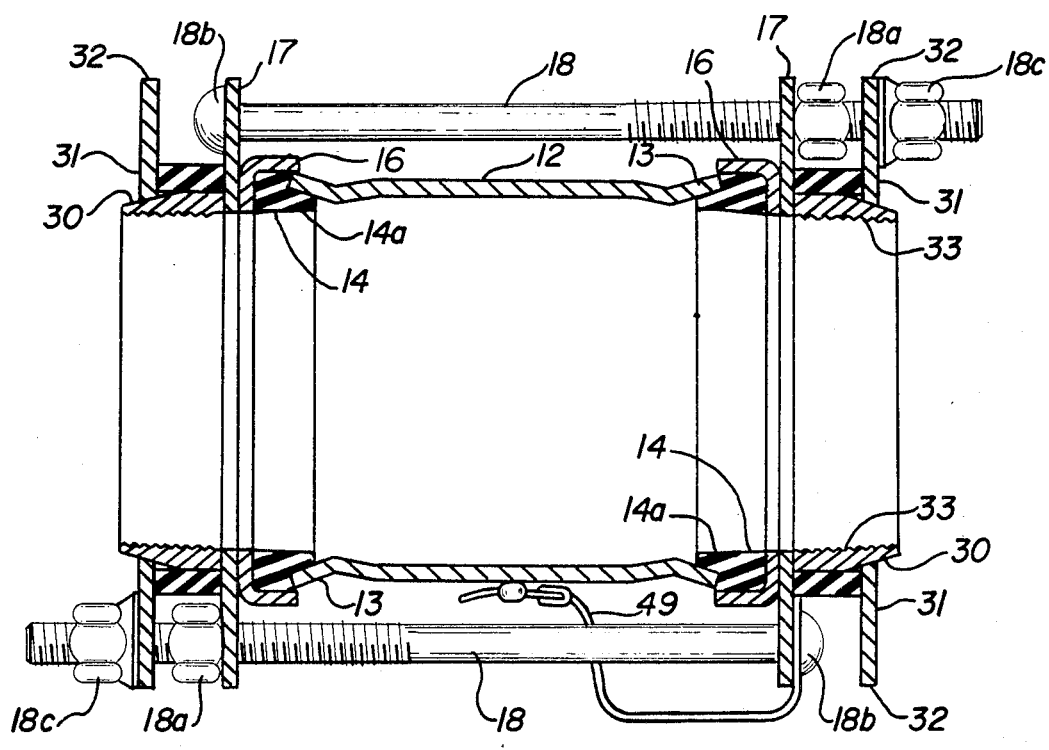
FIG. 1 is a section through a connector according to this invention.

Referring to the drawings there is illustrated a pair of pipe ends 10 and 11 to be connected. The opposite ends of the two pipes are anchored so that the pipe ends cannot move toward each other. A sleeve or middle ring 12 having a slightly larger internal diameter than the external diameter of pipes 10 and 11 is placed coaxially around the pipe ends 10 and 11 to be connected. Each end of sleeve 12 has a flared or frusto-conical portion 13 receiving an elastomeric gasket 14 having a short, cylindrical portion and a frusto-conical end portion 14a adapted to fit in flared end 13 of the sleeve. The elastomeric gasket 14 is adapted to fit snugly around the pipe ends 10 and 11 to be joined. An annular cup shaped follower 16 surrounds each pipe end 10 and 11, abuts the gasket 14 and is provided with paired radial lugs 17 having holes 17a receiving bolts 18 with tightening nuts 18a for drawing the followers axially toward the sleeve to force the gaskets into the frusto-conical ends of sleeve 12 and into sealing engagement with the outside surface of pipes 10 and 11. The follower means 16 are drawn together by bolts 18 and nuts 18a at one end and a head 18b at opposite end. Spaced from the follower means 16 at each end are back up rings 31 with conical openings 31a receiving split jaws 30. The split jaw 30 or its equivalent may be a split ring or separately connected jaws as in Felker or Rieffle et al., supra. The jaw 30 has toothed grooves 33 adapted to engage the surface of pipe ends 10 and 11. Paired radial lugs 32 with holes 32a receiving the threaded ends of bolts 18 are formed on the periphery of each back up ring 31. Nuts 18c on bolts 18 draw the back up rings 31 tightly over jaw means 30 with opening 31a compressing the jaw means 30 tightly around pipe ends 10 and 11 so that toothed grooves 33 are forced into the surface of the pipe ends and hold them against withdrawals.

The paired arrangement of lugs and bolts is such that when pull out pressure is applied to one of the pipes the follower means are urged together by the resulting force acting through bolts 18 on the two opposite follower means. This compresses the gasket 14 more tightly around the pipe ends making a tighter seal with increased frictional force preventing removal.

While certain preferred practices and embodiments of this invention have been illustrated and described in the foregoing specification, it will be understood that this invention may be otherwise embodied within the scope of the following claims.

I claim:

1. A coupling for joining two spaced coaxial pipe ends anchored against longitudinal movement comprising an elongate sleeve adapted to receive coaxially two opposing pipe ends to be connected, said sleeve having frusto-conical enlarged ends opening outwardly, a pair of cylindrical elastomeric gaskets having frusto-conical end portions adapted to fit into the frusto-conical ends of said sleeve in sliding engagement around the pipe ends to be connected, a follower member bearing on each of said gaskets to force them into the sleeve ends, tightening means acting on the follower member to move at least one of the follower member toward the other axially whereby the gaskets are forced into the frusto-conical ends of the sleeve in sealing engagement with said ends and the pipe ends to be connected, a pair of back up rings, one spaced from each follower members on the side opposite the sleeve member, each back up ring having a frusto-conical opening adapted to surround one of the pipe ends being connected, a frusto-conical jaw member having at least one slot therein permitting expansion and contraction thereof one of said pipe ends to be connected with the frusto-conical opening in said back-up ring, surface engaging means on the jaw member adapted to engage the exterior surface of each of said pipe ends to be connected and auxiliary tightening means between each follower member and one of the back up rings for drawing said one back up ring axially toward the said each follower means to force the frusto-conical jaw means into tight radial engagement with each said pipe end, said tightening means and auxiliary tightening means operative in at least two pairs, each pair connecting the two follower members and one back up ring so that axial movement of the two back up rings away from one another draws the two follower members toward each other.

2. A coupling as claimed in claim 1 wherein the tightening means is at least two pairs of elongate bolts and tightening nuts extending through radial lugs on each of said follower members and the auxiliary tightening means is an extension of said elongate bolts with each pair of bolts through radial lugs on a different one of the back up rings with tightening nuts.

3. A coupling as claimed in claim 1 or 2 wherein the surface engaging means on the jaw means are axially spaced annular teeth.

4. A coupling as claimed in claim 1 or 2 wherein the elastomeric gaskets are rubber.

* * * * *